Oct. 23, 1928.
J. F. WALLACE
SHACKLE CONSTRUCTION
Filed Sept. 29, 1924
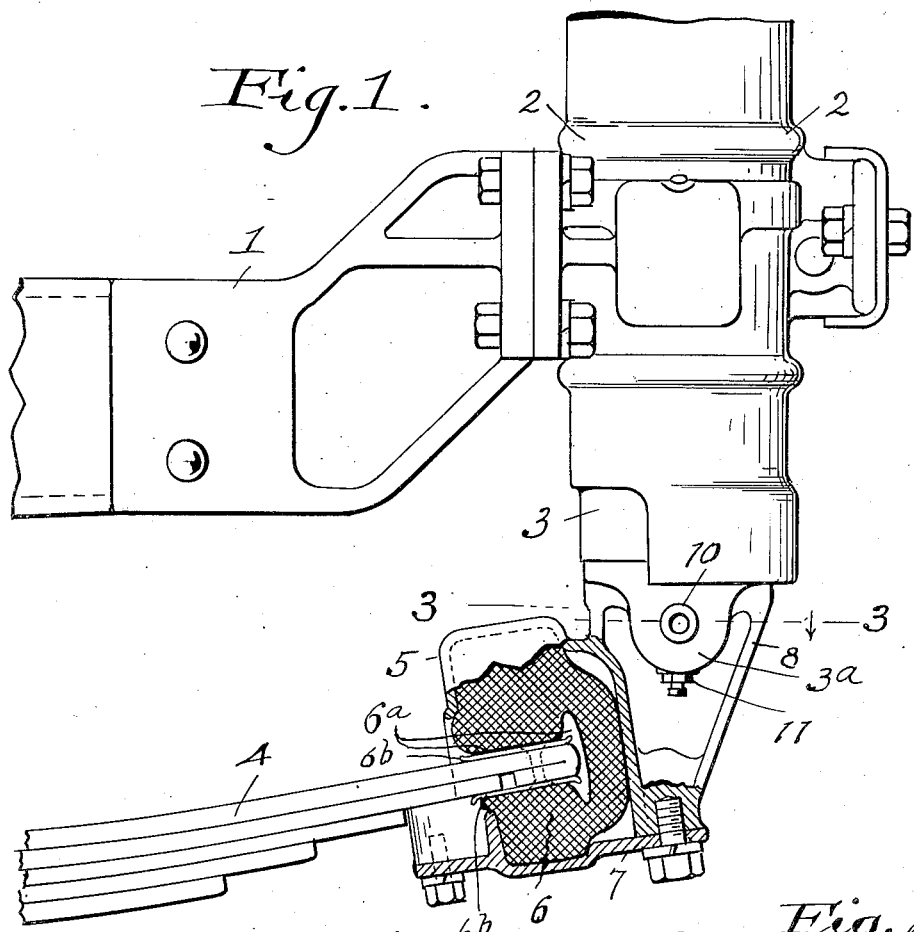
Fig. 1.
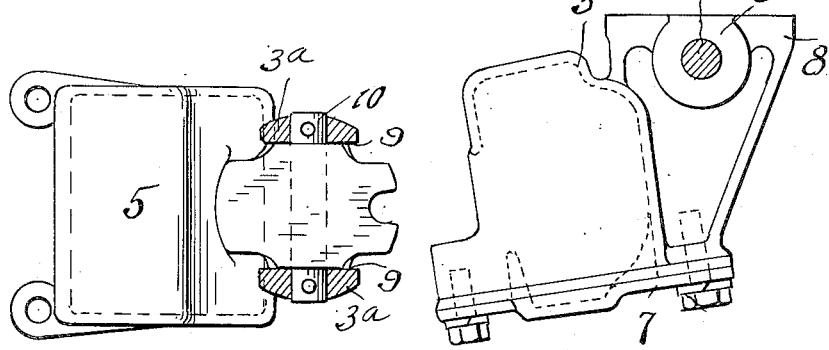
Fig. 2.
Fig. 3.
Inventor
John F. Wallace
Thurston Kwis+Hudson
attys Patented Oct. 23, 1928.

1,688,841

UNITED STATES PATENT OFFICE.

JOHN F. WALLACE, OF SHAKER HEIGHTS, OHIO, ASSIGNOR TO THE CLEVELAND PNEUMATIC TOOL COMPANY, OF CLEVELAND, OHIO, A CORPORATION OF OHIO.

SHACKLE CONSTRUCTION.

Application filed September 29, 1924. Serial No. 740,638.

This invention relates to what may be termed a shackle construction by which the free end of a leaf spring is connected to the plunger of a fluid suspension device adapted to be carried by the chassis or body of a vehicle.

Reference should be had to the accompanying drawings forming a part of this specification, in which Fig. 1 is an elevation with portions in section showing the subject matter of this invention in the form in which it is used; Fig. 2 is a side elevation of the shackle connection; and Fig. 3 is a section upon the line 3—3 of Fig. 1.

Referring to the drawings, 1 indicates a portion of the chassis of a motor vehicle to which there is attached a cylindrical casing 2 of a fluid cushioning device or pneumatic cushioning device. This device comprises the casing 2, and a movable plunger 3, and the movable plunger co-operates with a body of air or other fluid within the casing 2 in a manner which need not be here described with particularity inasmuch as such devices in general are well-known in the art.

A leaf spring, for supporting from the axle, the chassis of which the member 1 is a part, is indicated at 4, and the device of the present invention has for its purpose the connection of the end of the leaf spring 4 with the movable plunger 3.

The device, itself, is shown in side elevation in Fig. 2, and comprises a housing 5 which is empty, and is adapted to receive a resilient body, as, for instance, rubber, which is indicated at 6. The housing 5 has a removable cover plate 7, which enables the rubber to be inserted, and when the cover plate is fastened in position it exerts considerable pressure upon the resilient body 6 within the same. The resilient body 6 has a recessed portion 6ª, which is adapted to receive the end of the leaf spring. In order not to abrade the rubber, wear plates 6ᵇ may be employed between the rubber and the spring, as shown in Fig. 1.

The housing 5 has a bracket 8 extending therefrom, and this bracket has centrally arranged, a portion which has oppositely disposed flat faces, one of which is indicated at 9 in Fig. 2. This portion of the bracket, which has the flat faces, as described, has a hole extending transversely through it, which is adapted to receive a pin 10, which is indicated in Figs. 2 and 3.

The lower end of the plunger 3 has a pair of depending ears 3ª, and the space between the ears 3ª is just sufficient to receive the portion of the bracket 8 which has the flat faces 9, these flat faces co-operating with the ears 3ª. These ears are also provided with openings which are adapted to align with the opening in the bracket 8 which receives the pin 10, so that the pin 10 may be used to secure the bracket 8 to the ears 3ª. The top of the bracket 8 is flat, and engages with the flat surface on the under side of the plunger 3, so that there is no movement between the plunger 3 and the bracket 8, there being no pivoting action about the pin 10. This pin 10 may be prevented from movement by the use of a set-screw 11, such as indicated in Fig. 1.

It will therefore be seen from the description which has been given, that so far as the bracket 8 is concerned, which is in a way the equivalent of a shackle connection, the connection is a rigid one, but it will be readily understood that the resilient body 6 will act as a resilient connection between the spring and the bracket 8, so that to the extent that there is resiliency in the body 6, the connection is resilient, but so far as the bracket which holds the resilient body is concerned, it is fixed and stationary with respect to the parts to which it is attached.

This form of suspension has particular advantage in use with trucks, and in use with buses for passenger service.

Having described my invention, I claim:

1. The combination with a resiliently suspended plunger carried by the chassis of a motor vehicle and having a pair of spaced ears, and the end of a spring of the motor vehicle, of a connection comprising an elastic body with which the end of the spring co-operates, a housing for such body having a rigid extension provided with a portion adapted to extend between the ears of the plunger, and means for securing the plunger and the extension to each other.

2. The combination with a resiliently suspended plunger carried by the chassis of a motor vehicle and having a pair of spaced ears, and the end of a spring for the motor vehicle, of a connection comprising a resilient body with which the end of the spring co-operates, a housing having a chambered portion which contains the resilient body, and having a rigid extension provided with a part adapted to extend between the ears of the said plunger, the ears of the plunger and the portion of said extension co-operating therewith having aligned openings, and a pin extending through said openings and rigidly securing the extension to the plunger.

In testimony whereof, I hereunto affix my signature.

JOHN F. WALLACE.